Sept. 29, 1942.   R. E. WHITE   2,297,597
DETACHABLE GEAR HEAD FOR VALVES
Filed Nov. 29, 1940   4 Sheets-Sheet 1

RICHARD E WHITE
INVENTOR.

BY Lester B. Clark
ATTORNEY.

Sept. 29, 1942.  R. E. WHITE  2,297,597
DETACHABLE GEAR HEAD FOR VALVES
Filed Nov. 29, 1940    4 Sheets-Sheet 2

RICHARD E WHITE
INVENTOR.

BY Lester B. Clark.

ATTORNEY.

Sept. 29, 1942.  R. E. WHITE  2,297,597
DETACHABLE GEAR HEAD FOR VALVES
Filed Nov. 29, 1940  4 Sheets-Sheet 3

RICHARD E. WHITE,
INVENTOR.

BY  Lester B. Clark
ATTORNEY.

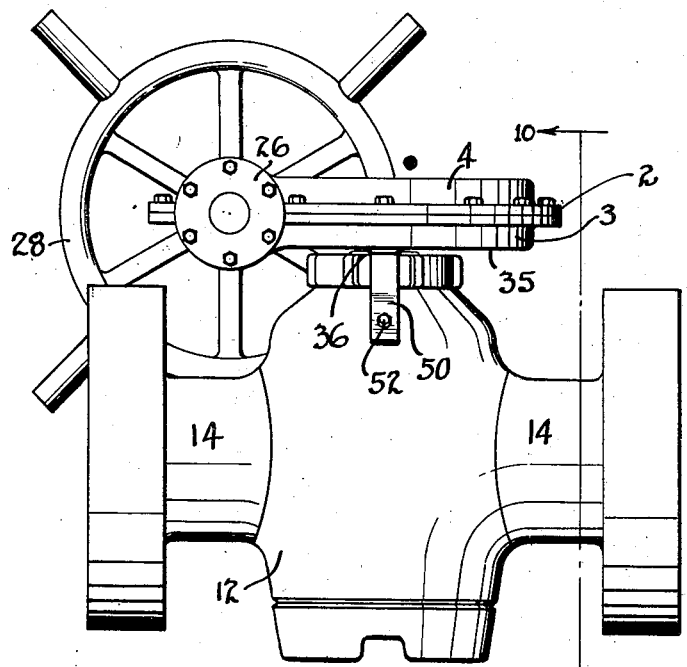
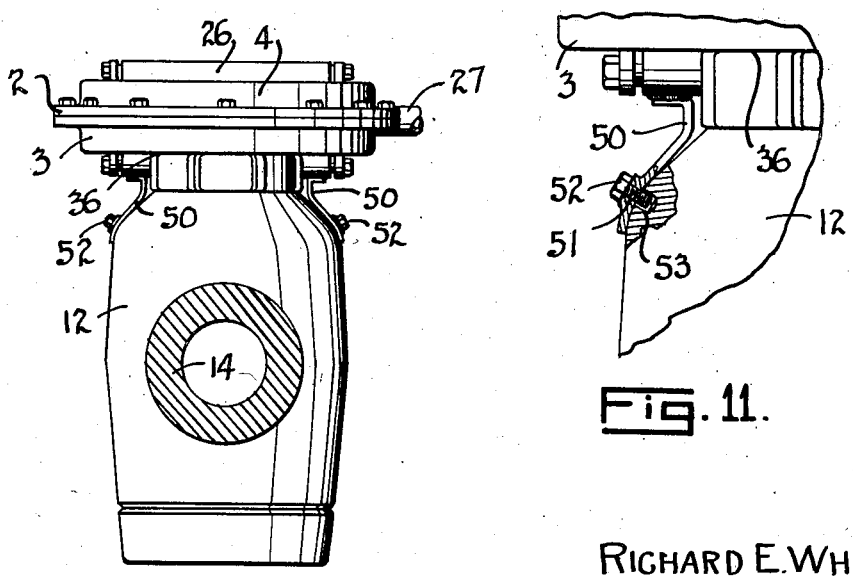

Patented Sept. 29, 1942

2,297,597

UNITED STATES PATENT OFFICE 2,297,597

DETACHABLE GEAR HEAD FOR VALVES

Richard E. White, Houston, Tex., assignor to Mission Manufacturing Company, Houston, Tex.

Application November 29, 1940, Serial No. 367,706

1 Claim. (Cl. 137—139)

The invention relates to a detachable gear head to be applied to valves.

In the operation of valves, and particularly valves of the plug type, when they are subjected to pressure or when the valve has not been operated frequently great difficulty is encountered in turning the valve or plug member by the use of the usual hand crank attached directly to the valve stem. The present invention directs itself to an attachment which can be readily applied to or removed from the valve body so as to obtain a mechanical advantage through a reduction gear or other mechanism whereby the operator may easily apply sufficient power to effect turning of the valve member.

The invention has particular application in connection with high pressure pipe lines and fittings, and may be applied as a permanent fixture to a valve or it may be applied periodically only when the valve is to be operated.

It is one of the objects of the invention to provide a detachable head for valves wherein a mechanical advantage is obtained in operating the valve.

Another object of the invention is to provide a reduction gear head to be applied to valves for operating the valves.

Another object of the invention is to provide an attachment for a geared valve head so that the head may be applied to and removed from an existing valve body.

Other and further objects of the invention will be readily apparent when the following description is considered in connection with the accompanying drawings wherein:

Fig. 9 is a side elevation of the valve with the gear attached by brackets.

Fig. 10 is a section on the line 10—10 of Fig. 9.

Fig. 11 is a broken section showing that connection of the bracket to the valve body.

Figure 2:
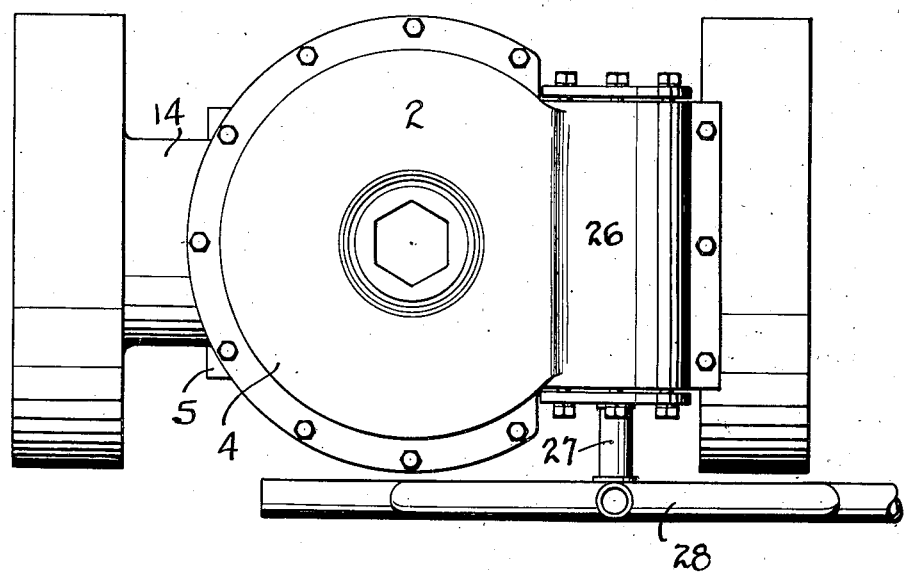
Fig. 2 is a top plan view looking down on the attachment applied to a valve.
Figure 1:
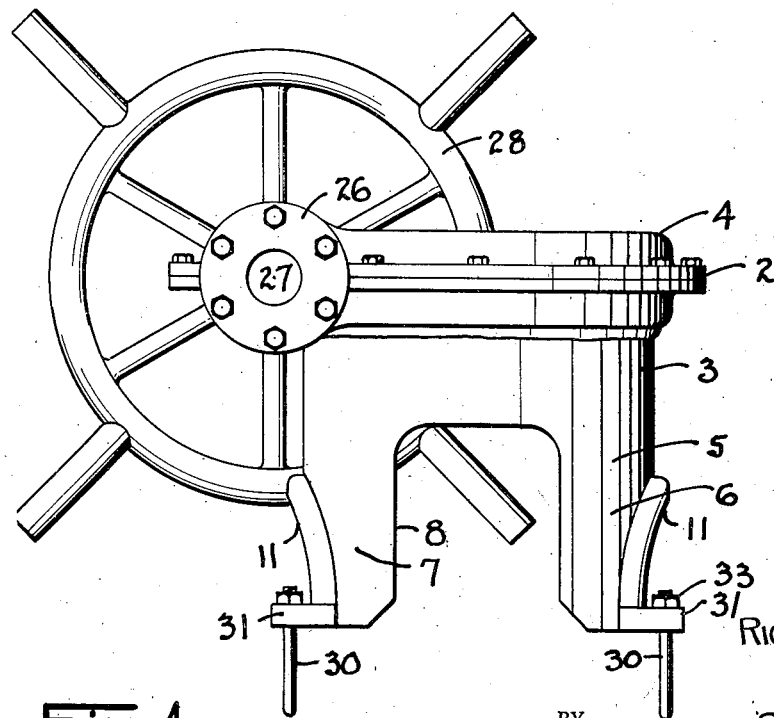
Fig. 1 is an end elevation of the attachment as may be applied to a valve.
Figure 3:
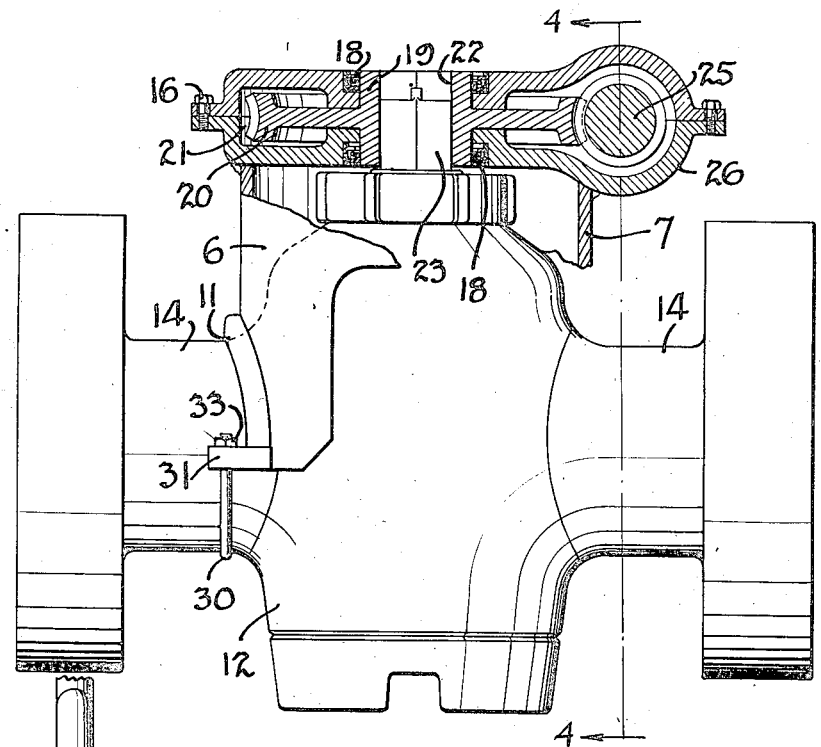
Fig. 3 is a side elevation of the valve with the attachment thereon wherein the attachment is shown in section.
Figure 4:
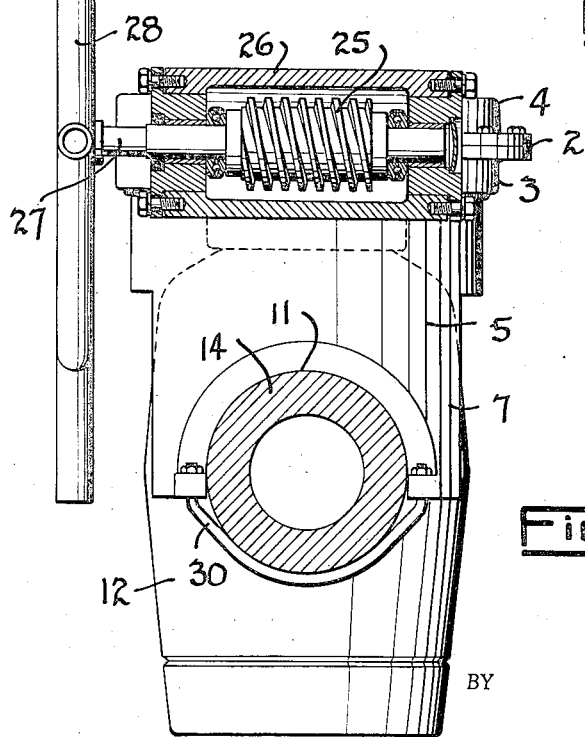
Fig. 4 is a section taken on the line 4—4 of Fig. 3.

The attachment is seen in Fig. 1 and comprises a body 2 which is made up of a base fitting 3 and a cap 4. The base fitting is in the form of a cylindrical member whose lower end is in the form of a yoke 5 having the side legs 6 and 7 with an opening or recess 8 therebetween. This recess is arranged to fit over the curved portion of the valve body 12 as best seen in Fig. 3. Each of the legs 6 and 7 of the yoke 5 has a seat 11 therein. These seats are arranged to fit over the flow line connections 14 on the opposite sides of the valve body 12 so that the attachment can be moved downwardly over the top of the valve, as best seen in Fig. 3.

The base 3 is arranged to have the cap 4 affixed thereto with the bolts 16, and both the cap and the base have a bearing opening 18 therein, which opening is arranged to receive the hub 19 of a gear 20. This gear is mounted to rotate in the chamber 21 formed in the top of the base or in the cap 4. The hub 19 has an opening 22 therein arranged to receive the valve stem 23 which projects from the top of the valve body 12.

A worm or pinion gear 25 is rotatably mounted in the extension 26 formed by the base and the cap. This worm or pinion 25 carries a spindle 27 which projects from the extension 26 and has a hand wheel 28 thereon.

It seems obvious that turning of the hand wheel 28 applies a mechanical advantage through the reduction gear 20 to the valve stem 23 so that an operator may obtain sufficient power to operate the valve under very high pressure, and even if it is stuck in position.

In order to affix the attachment to the valve so that it will be held firmly in place when in operation, the anchor bolts 30 are shown in Figs. 1 and 3 as having been passed through a flange 31 on the lower end of the legs 6 and 7. These anchor bolts 30 are shown in Fig. 3 as passing around the lower side of the flow line connections 14 so that as the nuts 33 are tightened up the attachment will be drawn firmly down on the top of the valve body and can be accurately locked and anchored.

The device may be readily applied to a valve when that valve is to be operated under higher pressure or when difficulty has been encountered in operating the valve. If the valve is operated infrequently the attachment may be removed if desired, or it may be permanently affixed to the valve as circumstances may warrant.

Figure 5:
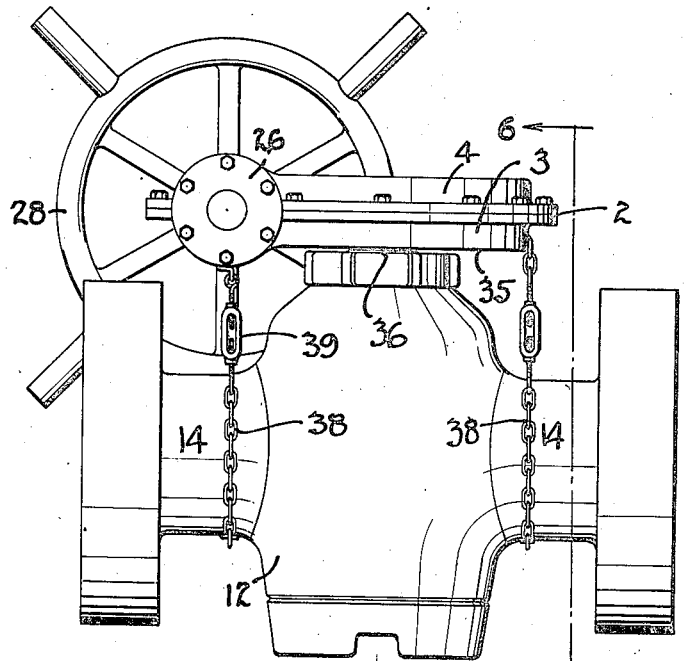
Fig. 5 shows the attachment applied to a valve where it is seated on the top of the valve body and retained in place by anchor chains.
Figures 6, 7, 8:
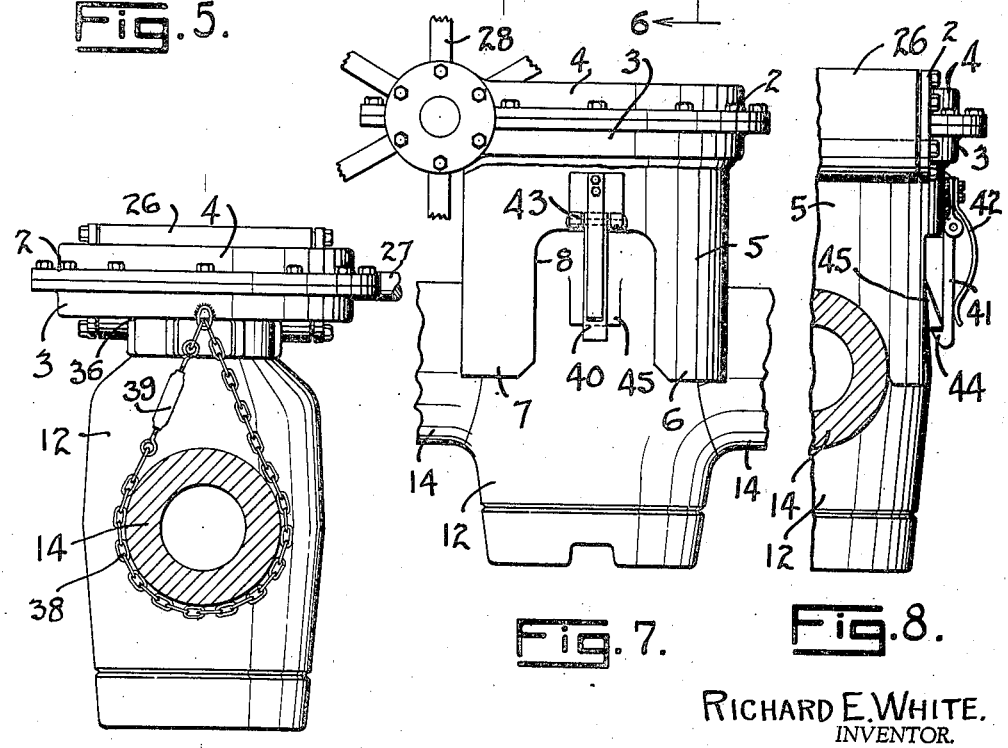
Fig. 6 is a section taken on the line 6—6 of Fig. 5.
Figs. 7 and 8 are side and end elevations respectively of a modified form for affixing the attachment.

Figs. 5 and 6 show a slightly modified form of the device wherein the base 3 does not have the yoke 5 thereon but has a flat lower face 35 which is arranged to engage the top 36 of the valve body 12. With this construction anchor chains 38 are connected to the base or arranged to pass underneath the flow line connections 14. A turn buckle 39 in each chain permits tightening or loosening of the chain as desired.

Figs. 7 and 8 show another form of the invention wherein a latch 40 in the form of a latch arm 41 and a spring 42 therefor is pivoted at 43 at the top of the recess 8 in the base 3. This latch arm has a toe 44 to engage underneath the lug 45 constructed on the side of the valve body 12. By removing and affixing this latch the entire attachment may be applied or removed as desired.

Figs. 9, 10, and 11 show a simple form of connection for the attachment to the valve body wherein brackets 50 are affixed to the base 3 and project downwardly and outwardly therefrom. The lower end of each bracket has a threaded opening 51 to receive the screw or bolt 52. The inner end of such screw or bolt is arranged to project into a recess 53 in the valve body so as to hold the bracket in place. If the bracket is of rigid material the screw or bolt will be worked in or out to attach or release the device, but if the brackets are of spring material the device may be snapped onto the valve.

A particular advantage of the device is that it may be readily removed and where a valve becomes worn and is to be replaced a material saving is accomplished by merely replacing the valve and applying the geared head to the new valve. With ordinary geared valves the entire gear structure must also be replaced.

Broadly, the invention contemplates a detachable gear head for valves wherein a mechanical advantage in operating the valve is obtained.

What is claimed is:

A detachable head for actuating rotatable valve stems including a head portion, a gear therein to be fitted over the stem of the valve whereby to turn said stem, means to turn said gear, and means to anchor said body to the valve including opposite bracket arms to fit down over a portion of the valve housing, and means to affix each of said bracket arms to the housing.

RICHARD E. WHITE.